Dec. 31, 1940.     F. P. SCULLY ET AL     2,227,323
VENT AND LIQUID LEVEL INDICATING MEANS FOR USE WITH TANKS
Filed Nov. 25, 1939
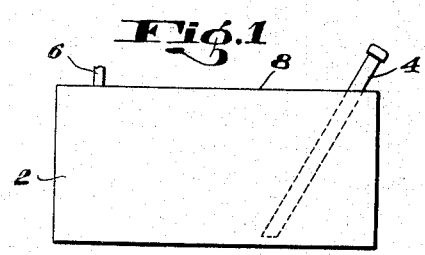
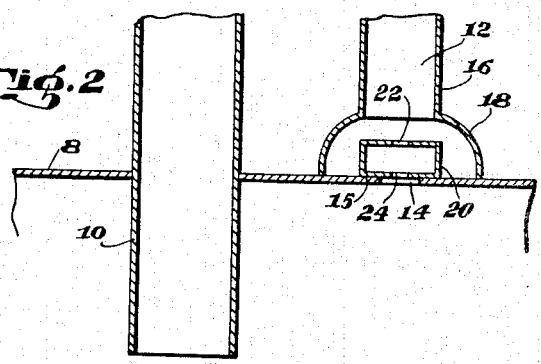
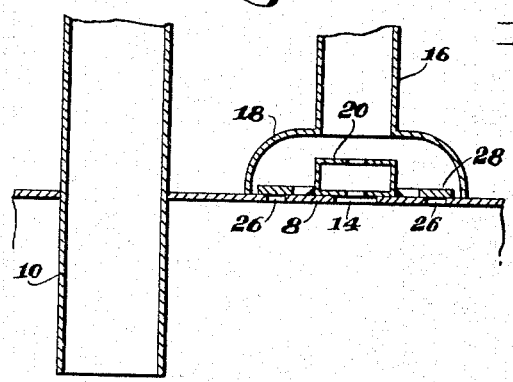
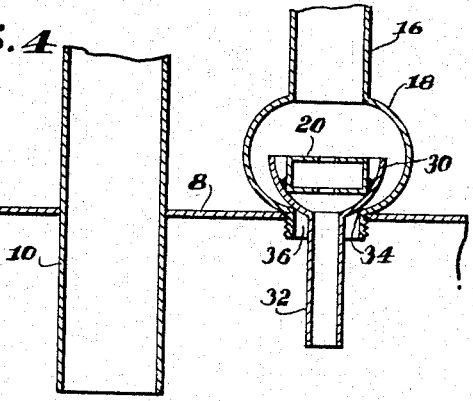
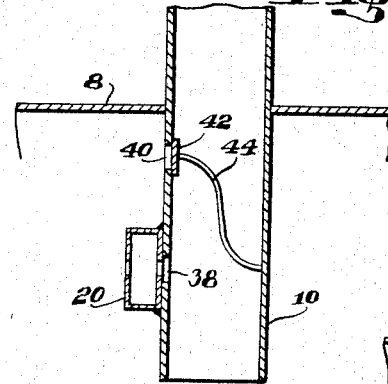
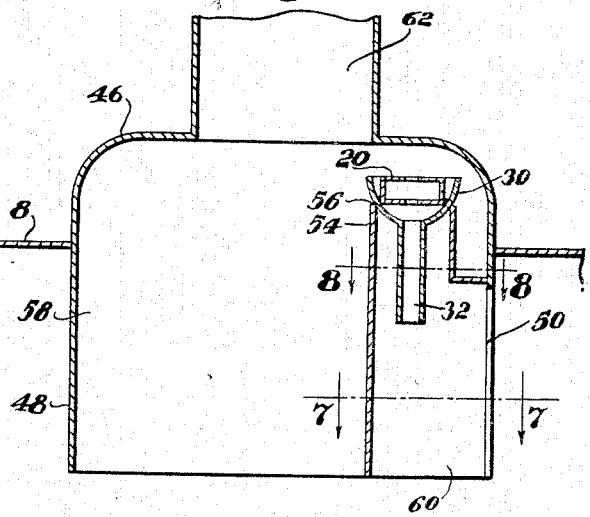
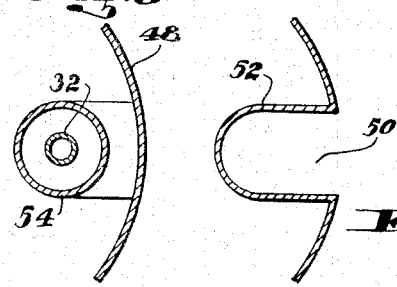
INVENTORS
Frank P. Scully
Alcide E. Mathey
BY C. Yardley Chittick
ATTORNEY.

Patented Dec. 31, 1940

2,227,323

UNITED STATES PATENT OFFICE 2,227,323

VENT AND LIQUID LEVEL INDICATING MEANS FOR USE WITH TANKS

Frank P. Scully, Cambridge, and Alcide E. Mathey, Auburndale, Mass., assignors to Scully Signal Co., East Cambridge, Mass., a corporation of Massachusetts Application November 25, 1939, Serial No. 306,144

11 Claims. (Cl. 137—111)

This invention relates to signaling means for indicating the level of liquids in tanks.

One of the objects of our invention is to provide a suitable venting means for use in connection with closed tanks which incorporates, in addition to the principal vent, a supplementary or auxiliary vent and an audible signal operable by gases escaping from the tank.

Audible signaling means for indicating the level of a rising liquid in a sealed tank is broadly old, as indicated by the United States Patents to Mathey, No. 2,135,522, Crossley, No. 2,143,476, and Mathey, No. 2,143,706. In all of these earlier inventions, however, the particular nature of the invention and the mode of operation are different than that of this invention, which will more particularly be set forth hereinafter.

Another object of our invention is the provision of an audible signal which does not become operative until the liquid level has risen to a predetermined point, but which thereafter goes into operation and remains so until the liquid level has risen either to the top of the tank or to an intermediate position between the point at which the whistle commenced and the top of the tank.

Still another object of our invention is the provision of an auxiliary or supplementary vent which comes into operation only after the principal vent has been sealed, but which at the same time is of such capacity that it is capable of handling the necessary volume of venting gas at pressures well within the safe limit of the tank.

These and other objects of our invention will become more apparent as the description proceeds with the aid of the accompanying drawing in which:

Fig. 1 is a diagrammatic view of a sealed tank showing filling and venting connections.

Fig. 2 is a detail of one form of venting connection and signaling device used therewith.

Fig. 3 is another form of venting connection and signaling device for use in connection therewith.

Fig. 4 is still another modification of the venting connection and signaling device.

Fig. 5 is still another modification.

Fig. 6 is a further modification.

Fig. 7 is a section on the line 7—7 of Fig. 6.

Fig. 8 is a section on the line 8—8 of Fig. 6.

Diagrammatically shown in Fig. 1 is a sealed tank 2 having a filling connection 4 and a venting connection 6. In a construction of this sort liquid is directed to the tank through the filling connection and the displaced gases leave the tank through the venting connection.

The upper surface of the tank is indicated at 8, and this upper surface is shown in considerable enlargement in Figs. 2, 3, 4, 5 and 6.

The showings in Figs. 2 to 6 are details of the venting connection generally referred to by the number 6 in Fig. 1.

In Fig. 2 the venting connection consists of an intrusion tube or principal vent 10 which extends downwardly into the tank any desired distance. The length of the tube will be controlled by the point at which it is desired to give indication of the level, as the signal will come into operation when the liquid level has risen to seal the lower end of tube 10. Elsewhere at the upper portion of the tank is a supplementary or auxiliary vent 12 which consists of an opening 14 through the tank, the circumference of which forms a seat 15, and a tube 16 connected thereto by a housing 18. Main vent 10 and tube 16 may be joined together to terminate in a large common vent, or they may be left individually, as shown.

Within housing 18 and resting on seat 15 is positioned a button type whistle 20 having upper and lower orifices 22 and 24 therethrough. Whistle 20 is free to float off the seat 15 when the pressure within the tank has risen to a predetermined degree.

In operation the construction shown in Fig. 2 performs as follows. Liquid rises in the tank and gas is forced out through the main vent 10. Some gas can pass through aperture 14 and whistle apertures 22 and 24 of the supplementary vent, but due to the fact that these latter orifices are considerably smaller than the main vent 10, very little gas passes through main vent 10, and such gas as does pass through the whistle travels at such low velocity and in such small volume that no audible sound is heard.

When the liquid level reaches the lower end of tube 10, the main vent is sealed so that any other gas escaping from the tank must pass through the supplementary vent 12, and in consequence thereof through whistle 20. Thus, immediately upon the level reaching the lower end of main vent 10, whistle 20 goes into operation, producing a distinctly audible sound which may be heard by the operator.

If the capacity of whistle 20 is not sufficient to handle the volume of gas that is being vented, the pressure developed within the tank will raise whistle 20 from its seat 15, thereby permitting by-passing of gas about the whistle to tube 16. However, even though the whistle be raised off the seat, whistling will continue because of the fact that the pressure on the top of the whistle is less than the pressure on the bottom, which results in the continued passage of gas through the whistle as well as the bypassing of gas therearound.

The size of the supplementary vent under any pressure conditions that may develop is adequate to handle the volume of gas that must be vented.

In the form shown in Fig. 3 the construction is much the same as that shown in Fig. 2, the difference residing, however, in the fact that whistle 20 is fixed over vent 14 to the top 8 of the tank so that it cannot rise from the position shown. Surrounding the whistle 20, however, and within the housing 18 is a plurality of auxiliary ports 26 through the tank, which ports are ordinarily maintained closed through the use of a gravity positioned valve 28, which, in the form shown, is in the nature of an annular washer.

The operation of this construction is the same as that of Fig. 2 except that after the lower end of tube 10 has been sealed and whistling caused by passage of gas through whistle 20 has commenced, excessive pressures and larger volumes of gas may be handled by the supplementary vent through the forcing of valve 28 from its seat over auxiliary ports 26, thereby increasing the venting capacity of the auxiliary vent a suitable amount.

In any event, after sealing of tube 10, whistling commences and continues until such time as the tank is filled.

In Fig. 4 the construction is varied somewhat through the provision of means operating in conjunction with the whistle for stopping the whistle before the liquid has risen all the way to the top of the tank. In this construction the auxiliary vent 16 has positioned in the housing 18 a whistle 20 which is maintained in a generally hemispherical supporting cup 30, which cup has extending downwardly from its bottom a tube 32. The cup 30 rests against a seat 34, effectively closing the passage 36.

In the operation of the construction of Fig. 4 the gas is vented through main vent 10 until such time as the lower end of vent 10 is sealed. Thereafter gas escaping from the tank passes upwardly through tube 32 and whistle 20 with the production of a whistling sound. When the liquid rises a further distance, however, to seal the lower end of tube 32, then whistling ceases. However, in order that gas may still be vented, the increasing pressure of the trapped gas may lift cup 30 off seat 34, permitting the gas thereafter to escape through passage 36 into housing 18 and out tube 16.

Thus it can be seen that even though the whistling is terminated before the liquid has reached the top of the tank, nevertheless an adequate bypass about the whistle is provided, and the bypass is brought into operation before dangerous pressure conditions are developed.

The construction of Fig. 5 is a further modification. In this form the whistle 20 is positioned on the side of the main vent 10 and in connection with a side orifice 38. At a point between orifice 38 and the top 8 of the tank is an auxiliary vent 40 which is normally maintained closed by valve 42 held in position by a spring 44. In operation this construction works as follows. As the liquid level rises, the gas is vented through vent pipe 10. Because of the restricted size of the orifices through whistle 20, practically no gas passes therethrough so that the whistle is inaudible. However, when the lower end of tube 10 is closed, then the venting gases pass through whistle 20 and orifice 38 into the main vent and an audible sound is produced, which, of course, may be heard by the operator.

When the liquid level has risen a further distance to seal the whistle 20 and orifice 38, the gas thereafter will be vented through port 40 as soon as the pressure is sufficient to force valve 42 away from its seat. Since the spring 44 is weak, the pressure required to open supplementary vent 40 is small and dangerous pressure conditions cannot develop. In this form the result is the same as that obtained through the use of the construction of Fig. 4, namely that the whistle is brought into operation when the liquid level has risen to the lower end of the main vent, but is thereafter silenced before the liquid level has risen to the top of the tank, while venting is continued through all stages.

The construction of Fig. 6 is a modification of that shown in Fig. 4 and involves housing the whistle and auxiliary vent within the confines of the main vent. In this case, extending through the top 8 of the tank is a domelike structure 46 terminating in a skirt 48 a suitable distance below the top of the tank. The right side of skirt 48 is cut away, as at 50, and to the vertical edges of this cut-away area is connected the generally semi-circular vertical wall 52, a section of which is shown in Fig. 7. This wall is formed into a tubular portion 54 (see Fig. 8) forming at its upper end a seat 56 against which rests cup 30 carrying whistle 20. From the lower portion of cup 30 depends tube 32.

From this construction it will be seen that the domelike member 46 has been divided into two compartments, a principal compartment 58 and a secondary compartment 60, but both join in a common vent, as at 62. In this construction, however, the vent 62 may be of such size as to act as a filling connection as well as a venting connection. This, of course, is possible if the dimensions of vent 62 are adequate to provide free passage of escaping gas. As the liquid level rises in the tank, the gas is vented through the main compartmen 58 and out through the common vent 62. When the liquid level reaches the bottom of skirt 48, further escape of gas through principal compartment 58 is prevented through the sealing of the lower end thereof. Thereafter any gas that may escape from the upper portion of the tank must pass through minor compartment 60, tube 32, whistle 20 and common vent 62, and, of course, when this takes place, whistling commences.

Thereafter whistling will continue until such time as the liquid level rises to seal the lower end of tube 32. When this takes place, further pressures that may develop will force cup 30 upwardly from seat 56, permitting the escape of gas thereby. Thus, the whistle and cup unit, being free to float off the seat, provides an adequate bypass so that dangerous pressure conditions can never develop.

In every case it will be seen that the whistle is open at all times to gases in the tank while the tank is being filled, but because of the differences in the areas of the principal vent and the orifices through the whistle, whistling will not take place until such time as the main vent is sealed. Thereafter, however, even though the main vent be sealed, the venting capacity of the tank is not limited by the size of the whistle orifices but rather by the capacity afforded through the opening of the auxiliary or supplementary vent which comes into operation instantly upon the development of pressures which cannot be adequately handled by the whistle proper.

While we have shown preferred forms of our invention, we wish it to be distinctly understood that we do not intend to be limited thereby, but only by the appended claims.

We claim:

1. An audible signaling device for indicating the level of rising liquid in a tank, comprising a main venting passage, a secondary venting passage including a whistle, a third supplementary venting passage, and a valve normally closing said third passage but operative to open when the pressure of the gas in said tank has increased to a predetermined degree.

2. An audible signaling device as set forth in claim 1, in which the entrance to the secondary venting passage is higher than the entrance to said main venting passage, whereby said main vent and whistle may be successively affected by a rising liquid level.

3. An audible signaling device as set forth in claim 1, in which the entrance to the secondary venting passage is higher than the entrance to said main venting passage, whereby said main vent may be closed and said whistle altered in succession, said secondary venting passage including said whistle having an effective venting area much less than said main vent passage, whereby a greatly increased volume of gas will pass through said whistle when said main venting passage is sealed by rising liquid, thereby rendering said whistle audible.

4. An audible signaling device for indicating the level of rising liquid in a tank, comprising a main venting passage and a secondary venting passage to the atmosphere having their entrance ends one above the other and adapted to be successively sealed by a rising liquid level, the main venting passage being of relatively large effective area, the secondary venting passage being of relatively small effective area and having a whistle in series therewith whereby venting gases will pass to the atmosphere through both the main venting passage and the secondary venting passage including said whistle, but without producing an audible sound until such time as said main venting passage is sealed by rising liquid to cause a greater volume of gas to pass through said secondary venting passage and whistle, a supplementary vent, and a valve normally restricting said supplementary vent but operative to open to vent additional gas when the pressure in said tank has increased to a predetermined degree.

5. An audible signaling device for indicating the level of rising liquid in a tank, comprising a main venting passage, a secondary venting passage commencing above said main venting passage and having a whistle in series therewith, a seat on which said whistle is positioned, said main venting passage and whistle being open at all times, said whistle adapted for movement upwardly off said seat under the influence of gas pressure in excess of a predetermined degree, thereby to provide a third supplementary venting passage.

6. An audible signaling device as set forth in claim 5, in which the entrance for gas escaping through said whistle in said secondary venting passage is in the form of a tube extending downwardly into said tank to a point intermediate the entrance to said main venting passage and the top of said tank.

7. An audible signaling device for indicating the level of rising liquid in a tank, comprising a main venting passage and an auxiliary vent, said auxiliary vent comprising a secondary venting passage commencing above said main venting passage and having a whistle in series therewith adapted to be rendered audible by gas passing therethrough in excess of a predetermined rate, a third supplementary venting passage, and a valve normally restricting said third passage but adapted to open when the pressure in said tank exceeds a predetermined degree, thereby to increase the effective venting area of said auxiliary port.

8. An audible signaling device for indicating the level of rising liquid in a tank, comprising a vent having three entrances thereto at different elevations and adapted to be successively sealed by rising liquid, the lowermost entrance being of relatively large effective area, the intermediate entrance having in series therewith a whistle audible when gas in sufficient volume is passed therethrough, and said uppermost entrance being normally closed by a valve adapted to open when the pressure in said tank exceeds a predetermined degree whereby the venting capacity may be increased a predetermined amount.

9. An audible signaling device for indicating the level of rising liquid in a tank, comprising a vent havng a tube extending downwardly therefrom into said tank, an aperture in the side of said tube, and a whistle fixed in series therewith, a second aperture in the side of said tube between said first aperture and the top of said tank, said second aperture being normally closed by a valve adapted to open when the pressure in said tank exceeds a predetermined degree.

10. An audible signaling device for indicating the level of rising liquid in a tank, comprisng a main venting passage and a secondary venting passage having a whistle in series therewith, said secondary venting passage having a valve member connected thereto, said secondary venting passage having a tube extending downwardly into said tank with its lower end above the lower end of said main venting passage, and a third supplementary venting passage normally closed by said valve member but adapted to open when the pressure in said tank exceeds a predetermined degree.

11. An audible signaling device for indicating the level of rising liquid in a tank, comprising a main venting passage, a secondary venting passage having a whistle in series therewith, a seat on which said whistle is positioned, said main ventng passage and whistle being open at all times, said whistle adapted for movement upwardly off said seat under the influence of gas pressure in excess of a predetermined degree, thereby to provide a third supplementary venting passage; the entrance for gas escaping through said whistle in said secondary venting passage being in the form of a tube extending downwardly into said tank to a point intermediate the entrance to said main venting passage and the top of said tank.

FRANK P. SCULLY.
ALCIDE E. MATHEY.